United States Patent [19]

Terry

[11] 4,408,153

[45] Oct. 4, 1983

[54] CURRENT SUPPLEMENTATION CIRCUIT FOR POWER SUPPLY

[75] Inventor: Michael B. Terry, Denton, Tex.

[73] Assignee: Mostek Corporation, Carrollton, Tex.

[21] Appl. No.: 335,147

[22] Filed: Dec. 28, 1981

[51] Int. Cl.³ .................................................. G05F 3/20
[52] U.S. Cl. .................................. 323/224; 179/81 R; 323/226; 323/268; 323/317
[58] Field of Search .......................... 179/70, 77, 81 R; 307/296 R, 297; 323/224, 226, 270, 268, 271, 273, 280, 281, 315–317

[56] References Cited

U.S. PATENT DOCUMENTS 4,282,478 8/1981 Leidich ............................... 323/316
4,297,646 10/1981 LoCascio et al. .................... 323/316

Primary Examiner—A. D. Pellinen

[57] ABSTRACT

A current supplementation circuit is designed to operate in conjunction with a two-terminal telephone line for supplying additional current to the output of a voltage regulator (42). A nonregulated voltage is received at first and second terminals (18, 20) with the nonregulated voltage comprising both DC and AC signals. An essentially regulated voltage is produced at a terminal (12) at the output of the voltage regulator (42). An essentially constant current is drawn from the first terminal (41) and provided to the second terminal (20) to provide an indication that the subscriber circuit is active. This constant current comprises first and second partial currents. The first partial current is passed through a control transistor (98) through a parasitic collector to the second terminal (14). The second partial current is passed through the control transistor (98) to the regulated voltage terminal (12) when the voltage at this terminal drops. The current supplementation circuit serves to bypass the voltage regulator (42) and supply additional current to the voltage regulated node when the voltage at that node drops below its intended level.

5 Claims, 1 Drawing Figure

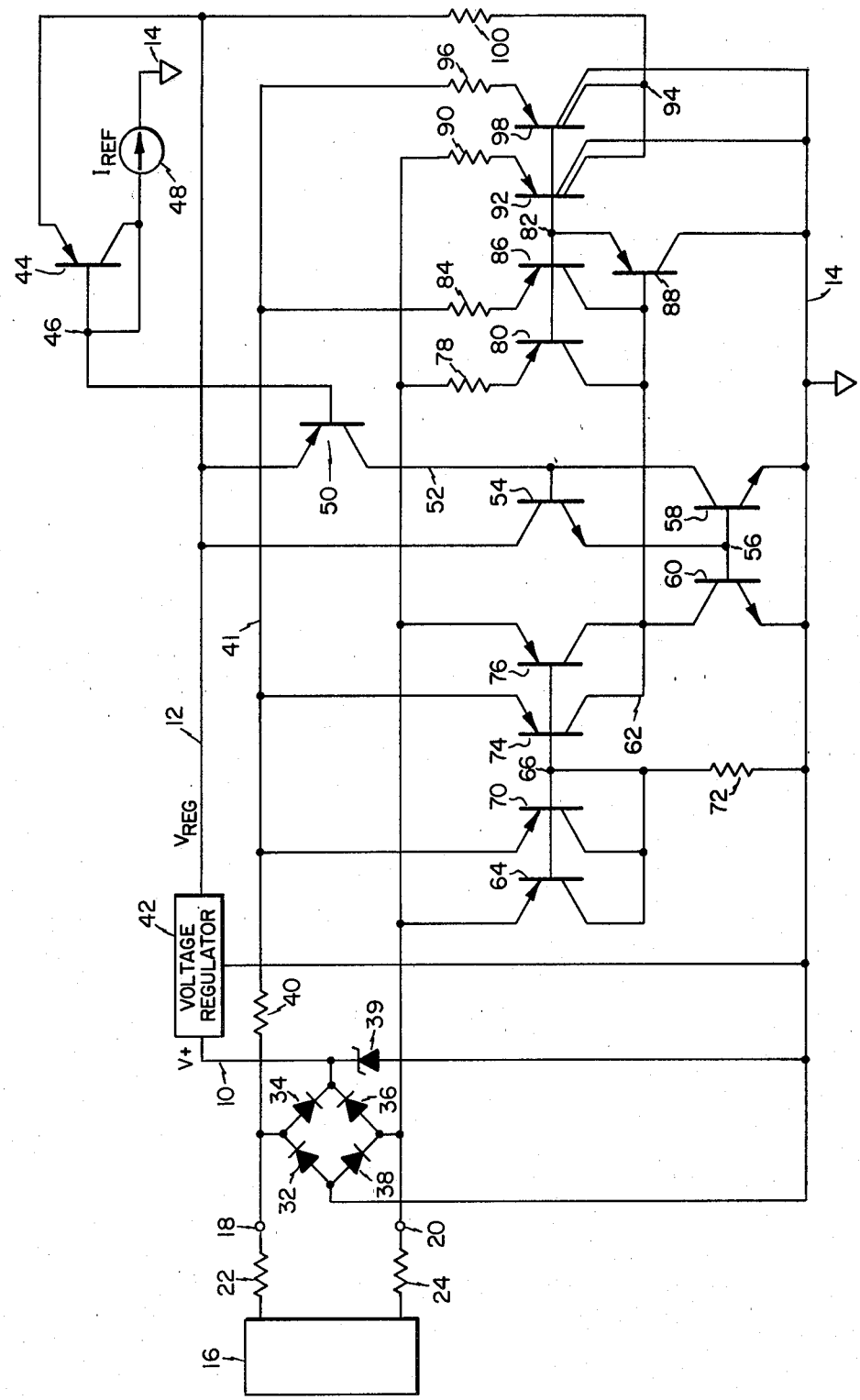

CURRENT SUPPLEMENTATION CIRCUIT FOR POWER SUPPLY

TECHNICAL FIELD

The present invention pertains in general to voltage regulation circuits and more particularly to voltage regulation circuits used by telephone subscriber circuits.

BACKGROUND OF THE INVENTION

In a telephone system a subscriber circuit is powered by a DC current that is transmitted through the telephone line. The audio communications between subscribers are also transmitted over the same lines as the DC current. The DC power which is transmitted through the telephone line may vary substantially in voltage depending upon a number of factors. The greater the length of the telephone line, the lower the voltage is which is available to the subscriber circuit. Further, in certain applications termed "a subscriber carrier system" an additional telephone line is tied onto an existing line and a minimal voltage is supplied through the additional line. In addition, tone dialing circuits utilize a substantial current to generate the tone signals. The current consumed by the tone generation circuit can pull the voltage at the subscriber circuit down to an unacceptable level.

In view of these problems in providing sufficient power to a telephone subscriber circuit through the telephone lines, there exists a need for a circuit which can detect when a regulated voltage produced by the circuit has become unacceptably low and then provide supplemental current into the regulated voltage terminal to boost the terminal to an acceptable voltage state.

SUMMARY OF THE INVENTION

A selected embodiment of the present invention is a current supplementation circuit for operation in a telephone system that receives a nonregulated voltage between first and second terminals and produces an essentially regulated voltage at a third terminal. The circuit includes circuit means for producing a reference current which flows from the third terminal to the second terminal. Further circuitry is responsive to the reference current for drawing an essentially constant current from the first terminal wherein the constant current is split into first and second partial currents. The first partial current is routed to the second terminal and the second partial current is routed to the third terminal. The amplitude of the second partial current is controlled to be inversely proportional with the amplitude of the voltage at the third terminal.

BRIEF DESCRIPTION OF THE DRAWING

For a more complete understanding of the present invention and the advantages thereof, reference is now made to the following description taken in conjunction with the accompanying FIGURE in which the FIGURE illustrates a schematic diagram of a circuit in accordance with the present invention.

DETAILED DESCRIPTION OF THE INVENTION

Referring now to the FIGURE, there is shown a schematic diagram of a current supplementation circuit in accordance with the present invention. The circuit includes a positive supply terminal 10, hereinafter denoted V+, a regulated supply terminal 12, hereinafter denoted $V_{reg}$, and a negative supply terminal 14 connected to ground.

A central station 16 is connected to a pair of input terminals 18 and 20 by a telephone line represented by the series resistors 22 and 24. The resistor 22 is connected between the central station 16 and an input terminal 18. The resistor 24 is connected between the central station 16 and an input terminal 20.

A diode 32 has the cathode thereof connected to the terminal 18 and the anode thereof connected to the negative supply terminal 14. A diode 34 has the anode thereof connected to the terminal 18 and the cathode thereof connected to the V+ terminal 10. A diode 36 has the anode thereof connected to terminal 20 and the cathode thereof connected to the V+ terminal 10. A diode 38 has the anode thereof connected to the negative supply terminal 14 and the cathode thereof connected to terminal 20.

The diodes 32, 34, 36, and 38 comprise a bridge network that allows the telephone lines to be connected to the terminals 18 and 20 independent of polarity such that the V+ terminal 10 is always positive relative to the supply terminal 14.

A zener diode 39 having the cathode thereof connected to the V+ terminal 10 and the anode thereof connected to the negative supply terminal 14 provides an overvoltage protection for the circuit.

A resistor 40 is connected between terminal 18 and a node 41.

A voltage regulator 42 has a first terminal connected to the V+ terminal 10, a second terminal connected to the $V_{reg}$ terminal 12, and a third terminal connected to the negative supply terminal 14. The regulator 42 provides a regulated voltage on the $V_{reg}$ terminal 12 wherein the $V_{reg}$ voltage is lower than the voltage on the V+ terminal 10.

A PNP transistor 44 has the emitter thereof connected to the $V_{reg}$ terminal 12, the base thereof connected to a node 46, and the collector thereof connected to the node 46. A current source 48 is connected between the node 46 and the negative supply terminal 14. The current source 48 supplies a constant current $I_{ref}$.

A PNP transistor 50 has the emitter thereof connected to the $V_{reg}$ terminal 12, the base thereof connected to the node 46 and the collector thereof connected to a node 52. The transistors 44 and 50 comprise a current mirror with the transistor 44 operable as the master side of the current mirror and the transistor 50 operable as the slave side of the current mirror. The current through the emitter to the collector of the transistor 50 is proportionally related to $I_{ref}$. In a selected embodiment of the present invention, the current through transistor 50 is adjusted to be approximately 44 microamps.

An NPN transistor 54 has the collector thereof connected to the $V_{reg}$ terminal 12, the base thereof connected to the node 52 and the emitter thereof connected to a node 56.

An NPN transistor 58 has the collector thereof connected to the node 52, the base thereof connected to the node 56 and the emitter thereof connected to the negative supply terminal 14. An NPN transistor 60 has the collector thereof connected to a node 62, the base thereof connected to the node 56 and the emitter thereof connected to the negative supply terminal 14. The transistors 58 and 60 comprise a current mirror circuit. The transistor 58 comprises the master side of the current mirror and the transistor 60 comprises the slave side of the current mirror.

The current through the slave transistor 50 passes through the transistor 58 and is mirrored to the transistor 60 to provide a slave current source. The 44 microamps of current through transistor 50 is proportionally multiplied and a current of approximately 560 microamps is sourced through the transistor 60. This current is proportional to the current $I_{ref}$ of the current source 48. The transistor 54 provides sufficient current to drive both the base-to-emitter junction of the transistor 58 and the base-to-emitter junction of the transistor 60 without drawing excess current from the node 52.

A PNP transistor 64 has the emitter thereof connected to the terminal 20, the base thereof connected to a node 66 and the collector thereof connected to node 66. A PNP transistor 70 has the emitter thereof connected to the node 41, the base thereof connected to the node 66 and the collector thereof connected to the node 66. A resistor 72 is connected between the node 66 and the negative power supply terminal 14.

A PNP transistor 74 has the emitter thereof connected to the node 41, the base thereof connected to a node 66 and the collector thereof connected to the node 62. A transistor 76 has the emitter thereof connected to terminal 20, the base thereof connected to the node 66 and the collector thereof connected to the node 62. The transistors 64 and 76 in conjunction with the resistor 72 comprise a current source when the voltage on the input terminal 20 is positive. The transistors 70 and 74 in conjunction with the resistor 72 comprise a current source when the voltage on the input terminal 18 is positive. For example, assume that the voltage on the input terminal 18 is positive relative to the input terminal 20. Under this condition the emitters of the transistors 64 and 76 are connected to ground and do not conduct current. The transistors 70 and 74, on the other hand, are connected to a positive voltage at the node 41, thus allowing the emitters of the transistors to conduct current. The transistor 70 is connected in a diode configuration. The resistor 72 provides a current path to the negative supply terminal 14 which forward biases the emitter-base junction of the transistor 70. The resistor 72 also provides a current path for emitter-to-base current through the transistor 74. The current through the transistor 70 is set by the voltage on the node 41 and the impedance of the resistor 72. Since the transistors 70 and 74 are fabricated in the same process, the emitter-to-base voltage drop for the transistor 70 is essentially the same as that for the transistor 74. This results in a direct current relation between the two transistors. However, this current is subject to variations due to the voltage at node 41. It should be understood that when a positive voltage is applied to the input terminal 20 the transistors 64 and 76 operate in a similar manner.

A resistor 78 is connected between terminal 20 and the emitter of a PNP transistor 80. The transistor 80 has the base thereof connected to a node 82 and the collector thereof connected to the node 62.

A resistor 84 is connected between the node 41 and the emitter terminal of a PNP transistor 86. The transistor 86 has the base thereof connected to the node 82 and the collector thereof connected to node 62. A PNP transistor 88 has the emitter thereof connected to the node 82, the base thereof connected to the node 62 and the collector thereof connected to the negative supply terminal 14.

When the input terminal 18 is positive relative to terminal 20, the transistors 88 and 86 in conjunction with the resistor 84 are connected in a diode configuration and supply current to the slave current source transistor 60. When the input terminal 20 is positive relative to terminal 18, the transistors 88 and 80 in conjunction with the resistor 78 are connected in a diode configuration to supply current to the slave transistor 60.

A resistor 90 is connected between terminal 20 and the emitter of a PNP transistor 92. The transistor 92 has the base thereof connected to the node 82. The transistor 92 has two collectors, a main collector and a parasitic collector. The main collector is connected to a node 94 and the parasitic collector is connected to the negative supply terminal 14.

A resistor 96 is connected between the node 41 and the emitter of a PNP transistor 98. The transistor 98 has the base thereof connected to the node 82. The transistor 98 is similar to the transistor 92 and also has two collectors, a main collector and a parasitic collector. The main collector of transistor 98 is connected to the node 94 and the parasitic collector is connected to the negative supply terminal 14. The parasitic collector of the transistors 92 and 98 allow the transistor, in a saturated state, to drive a limited current through the parasitic collector. The main portion of the transistor current flows through the main collector rather than the parasitic collector. The current that flows from the main collectors of the transistors 92 and 98 flows through a resistor 100 to the $V_{reg}$ terminal 12. It should be understood that only one of the transistors 92 and 98 is conducting at any given time since only one of the terminals 18 or 20 is more positive at any given time.

Referring further to the FIGURE, a more detailed description of the operation of the circuit is presented. As described above, the current through the transistor 60 is approximately 560 microamps and is referenced to the current $I_{ref}$ through the current source 48. The current through the transistor 60 is a constant current and does not significantly vary with voltage. The collector of the transistor 60 draws current from the node 62. This current is supplied to the node 62 by either of the transistors 74, 76, 80 or 86. For purposes of clarity in this description, the node 41 is set positive relative to the terminal 20. As a result, the transistors 64, 76, 80 and 92 are reverse biased and do not conduct current. It should be understood, however, that when the input terminal polarity is reversed, the transistors 70, 74, 86 and 98 are reverse biased and do not conduct while the transistors 64, 76, 80 and 92 are operative.

As described above, the more positive voltage at terminal 41 drives the emitter-base junction of the transistors 70 and 74 to supply current to the resistor 72. The transistor 74 then acts as a current source and supplies a portion of the 560 microamp current to the transistor 60. The positive voltage on the node 41 also forward biases the emitter-base junction of the transistor 86 and the emitter-base junction of the transistor 88. The transistor 86 comprises the master side of a current source and supplies the remaining portion of the 560 microamp current to the transistor 60. The current through the transistor 86 is mirrored to the transistor 98. The current through the transistor 98 is approximately 8 times the current through the transistor 86. The current through the emitter of the transistor 98 is approximately 6 milliamps because transistor 98 is fabricated to be considerably larger than the transistor 86.

The transistor 80 provides the master side of a current mirror to drive the base-emitter junction of the transistor 92. Since the transistor 92 is a larger device and passes substantially more current than the transistor 80, the transistor 88 receives the higher emitter-to-base current from the transistor 92 without injecting this emitter-to-base current into the collector of the transistor 60.

An important aspect of the present invention is that the current flowing into the emitter of the transistor 98 flows either into its base or collector terminals. The percentage of current that flows into either is determined by the voltage level on the $V_{reg}$ terminal 12. When the $V_{reg}$ terminal 12 is much lower than the base voltage on the transistor 98, the collector comes out of saturation and current is drawn to the main collector, through the resistor 100, and to the $V_{reg}$ terminal 12. As the voltage level on the $V_{reg}$ terminal 12 increases, the main collector of the transistor 98 returns to saturation and current now is drawn primarily through the emitter-to-base junction and passes through the emitter-to-collector of the transistor 88. In this condition, the transistor 98 operates like a diode. In addition, when the transistor 98 is in saturation, approximately 30% of the current through the emitter thereof passes through the parasitic collector to the negative supply terminal 14. The parasitic collector is operable to siphon off a percentage of the emitter current when the transistor is saturated but when the main collector comes out of saturation, the parasitic collector draws substantially less current.

Another important aspect of the present invention is that the current through the resistor 96 is essentially constant, that is, the emitter current of the transistor 98 passes through either the base terminal to the transistor 98 or the main collector. It should be understood that when the collector is between the saturated and the unsaturated state, the emitter current is flowing both to the base and to the main collector.

The constant current drawn by the transistor 98 is important in applications where the subscriber circuit is connected to a system that utilizes the variations in current draw to transmit the audio modulation. For example, in a subscriber carrier system connected to a telephone line there is only a limited amount of current drive available. When circuits such as a dual tone multifrequency (DTMF) source are connected to the $V_{reg}$ terminal 12, the voltage level on the $V_{reg}$ terminal 12 can decrease due to the increased current draw of the DTMF source. To prevent the additional current to the DTMF source from modulating the telephone line, the circuit of the present invention supplies the necessary current by directing the current through the emitter of the transistor 98 from the path through the base thereof and the transistor 88 to the path through the main collector and the resistor 100. Since the current through the emitter of the transistor 98 is constant, no additional current is drawn from the telephone line.

The current source comprising the transistors 70 and 74 is operational to decrease the current through the resistor 96 when the voltage difference between the node 41 and the $V_{reg}$ terminal 12 increases. It should be understood that only one of the above current sources is operable at any given time. This current source is useful when the circuit of the present invention is utilized in a system having sufficient current drive capability to maintain the proper level on the $V_{reg}$ terminal 12.

In summary, the circuit of the present invention enables a telephone subscriber's circuit, when connected to a subscriber carrier system, to operate in a low current drive condition. When devices such as the DTMF source are connected to the related power supply terminal, the present circuit reduces the sensitivity of the telephone line to the activation of these devices. This is due to the constant current drawn by the circuit regardless of the current drawn from the regulated power supply terminal.

Although the preferred embodiment of the present invention has been described in detail, it should be understood that various changes, substitutions and alterations can be made therein without departing from the spirit and scope of the invention as defined by the appended claims.

I claim:

1. A current supplementation circuit for operation in a system that receives a nonregulated voltage between first and second terminals and produces an essentially regulated voltage at a third terminal, the circuit comprising:
   means for producing a reference current flowing from said third terminal to said second terminal, and
   means responsive to said reference current for drawing an essentially constant current from said first terminal, said constant current split into first and second partial currents, said first partial current routed to said second terminal and said second partial current routed to said third terminal, said means for drawing an essentially constant current establishing the amplitude of said second partial current inversely to the amplitude of the voltage of said third terminal.

2. The current supplementation circuit recited in claim 1 wherein said means for producing a reference current comprises:
   a constant current source,
   a first current mirror circuit having a master first transistor connected serially with said current source and including a slave second transistor connected to pass current from said third terminal to said second terminal, and
   a second current mirror circuit having a master third transistor connected serially with said slave second transistor and having a slave fourth transistor which passes said reference current to said second terminal.

3. The current supplementation circuit recited in claim 1 wherein said means for drawing an essentially constant current comprises:
   a first resistor,
   a second resistor,
   a current mirror circuit including a master bipolar transistor having the emitter terminal thereof coupled through said first resistor to said first terminal and the collector terminal thereof connected to a node which receives said reference current, said current mirror circuit further including a slave transistor having the emitter terminal thereof coupled through said second resistor to said first terminal and a first collector terminal thereof coupled to said third terminal and a second collector terminal thereof coupled to said second terminal.

4. A current supplementation circuit for operation in a system that receives a nonregulated voltage between first and second terminals and produces from a voltage regulator an essentially regulated voltage at a third terminal, the current supplementation circuit comprising:

- a constant current source,
- a first circuit mirror circuit having a master first bipolar transistor connected serially between said third terminal and said second terminal and including a slave bipolar second transistor connected between said third terminal and a first node,
- a second current mirror circuit having a master bipolar third transistor connected serially between said first node and said second terminal and including a slave, bipolar fourth transistor connected between a second node and said second terminal,
- a third current mirror circuit having a master bipolar fifth transistor connected between said first terminal and a third node and including a slave bipolar sixth transistor connected between said first terminal and said second node,
- a first resistor connected between said third node and said second terminal,
- a second resistor,
- a third resistor, and
- a fourth current mirror circuit having a master seventh transistor having the emitter terminal thereof coupled through said second resistor to said first terminal and having the collector terminal thereof connected to said second node, said fourth current mirror circuit further including a slave bipolar eighth transistor having the emitter terminal thereof coupled through said third resistor to said first terminal and a first collector terminal thereof coupled to said third terminal and a second collector terminal thereof connected to said second terminal.

5. The current supplementation circuit recited in claim 4 wherein said first collector terminal of said eighth transistor is the primary collector terminal thereof and said second collector terminal of said eighth transistor is a parasitic collector terminal thereof.

* * * * *